(12) United States Patent
Strube

(10) Patent No.: US 10,189,545 B2
(45) Date of Patent: Jan. 29, 2019

(54) CLEAT AND CLEAT FAIRING FOR A BOAT

(71) Applicant: Mark Roger Strube, Bonita, CA (US)

(72) Inventor: Mark Roger Strube, Bonita, CA (US)

( * ) Notice: Subject to any disclaimer, the term of this patent is extended or adjusted under 35 U.S.C. 154(b) by 85 days.

(21) Appl. No.: 15/279,181

(22) Filed: Sep. 28, 2016

(65) Prior Publication Data

US 2018/0065711 A1  Mar. 8, 2018

Related U.S. Application Data

(60) Provisional application No. 62/383,786, filed on Sep. 6, 2016.

(51) Int. Cl.
*B63B 21/08* (2006.01)
*F16G 11/10* (2006.01)
*F16G 11/04* (2006.01)

(52) U.S. Cl.
CPC ........... *B63B 21/08* (2013.01); *F16G 11/04* (2013.01); *F16G 11/10* (2013.01); *F16G 11/105* (2013.01); *F16G 11/106* (2013.01)

(58) Field of Classification Search
CPC ........ F16G 11/04; F16G 11/044; F16G 11/10; F16G 11/105; F16G 11/106; F16G 11/101; B63B 21/08
USPC .............. 114/199, 101, 200, 210, 218; 24/134 P–134 N, 134 R–134 P
See application file for complete search history.

(56) References Cited

U.S. PATENT DOCUMENTS

| 1,520,716 | A | * | 12/1924 | Judd | H02G 1/02 |
| | | | | | 114/218 |
| 3,051,116 | A | * | 8/1962 | Weil | B63B 21/08 |
| | | | | | 114/199 |
| 3,765,061 | A | * | 10/1973 | Nash | A43C 3/04 |
| | | | | | 114/210 |
| 3,795,218 | A | * | 3/1974 | Merry | B63B 21/08 |
| | | | | | 114/218 |
| 3,973,511 | A | * | 8/1976 | Balston | B63B 21/04 |
| | | | | | 114/218 |
| 4,092,941 | A | * | 6/1978 | Gryglas | B63B 21/08 |
| | | | | | 114/218 |
| 5,467,726 | A | * | 11/1995 | Hutchins | B63H 9/1028 |
| | | | | | 114/106 |
| 8,973,512 | B2 | * | 3/2015 | Dunn | B63H 9/10 |
| | | | | | 114/102.12 |

* cited by examiner

*Primary Examiner* — Ajay Vasudeva
(74) *Attorney, Agent, or Firm* — Whitmyer IP Group LLC

(57) ABSTRACT

A cleat for a boat includes a cam mounted to the boat, where the cam has a rotatable toothed surface for pressing against a line. The cleat also includes a guide mounted to the boat adjacent the cam, where the guide has a surface for directing the line above a top of the cam. In addition, the cleat has a slot formed in the surface of the guide, which permits the line to be moved into opposition with the rotatable toothed surface of the cam.

20 Claims, 7 Drawing Sheets

CLEAT AND CLEAT FAIRING FOR A BOAT

TECHNICAL FIELD

The present disclosure relates generally to a cleat for a boat, and more particularly to a cleat for a boat having a cam mounted to a boat, and a guide mounted to the boat adjacent the cam with a slot formed in the surface of the guide.

BACKGROUND

Cleats are typically used on boats to secure a line. Securing a line to a cleat can be difficult when trying to cleat the line while: 1) holding the line at a distance from the cleat, 2) holding the line at an awkward angle to the cleat, or 3) the boat is unstable. As a result, moving, adjusting, and securing lines on a boat can be a difficult and time-consuming process. In addition, some cleats can cause unnecessary wear and tear on a line as a result of the line snagging on the edges of the cleat. Similarly, some cleats pose a safety risk to a sailor since sliding into a prior art cleat is a frequent source of bruising and injury to a sailor.

Aspects of the present invention are directed to these and other problems.

SUMMARY

According to an aspect of the present invention, a cleat for a boat includes a cam mounted to the boat, which has a rotatable toothed surface for pressing against a line. The cleat also includes a guide mounted to the boat, which is adjacent to the cam. The guide has a surface for directing the line above a top of the cam. In the surface of the guide, a slot is formed, which permits the line to be moved into opposition with the rotatable toothed surface of said cam.

According to another aspect of the present invention, a method of using a cleat includes the steps of: directing a line along a surface of a boat and toward a guide mounted to the boat adjacent a cam; raising the line away from the surface of the boat using a surface of the guide; directing the line into a slot formed in the surface of the guide so that the line snaps into the cleat; pressing a toothed surface of the cam against the line so that the line is secured.

In addition to, or as an alternative to, one or more of the features described above, further aspects of the present invention can include one or more of the following features, individually or in combination. The guide surrounds the cam on at least two sides. The guide surrounds the cam on at least three sides. The guide substantially completely surrounds the cam. The guide has a base. The cam is mounted on a cam base. The cam base is mounted on the base, and the guide substantially surrounds the cam. The base has a recess, and the cam base is mounted in the recess. A distance from a surface of the boat to a top surface of the base is $h_1$, a distance from the top surface of the base to the top of the cam is $h_2$, a distance from the surface of the boat to the top of the cam is $h_3$, and $h_3$ is substantially equal to the sum of $h_1$ and $h_2$. A distance from the surface of the boat to a bottom surface of the cam base is $h_4$, and $h_4$ is substantially equal to $h_1$. The base has a recess, and said cam base is mounted in the recess, where a distance from the surface of the boat to a bottom surface of said cam base is $h_4$, and $h_4$ is less than $h_1$. The cam is mounted on a cam base, a distance from a surface of the boat to a bottom surface of the cam base is $h_4$, and $h_4$ is substantially equal to zero. The base includes at least one drainage channel configured to allow water to drain off a top surface of the base. The cam is a first cam, and the rotatable toothed surface is a first rotatable toothed surface, and the cleat also includes a second cam having a second rotatable toothed surface; and the first cam is adjacent to the second cam such that the first rotatable toothed surface is opposing the second rotatable toothed surface. The slot is U-shaped. The cleat has an opening formed in the surface of the guide, and the slot and the opening are on opposite sides of the cam. The guide raises the line to the top of the cam. The cleat includes at least one fastener attaching at least one of the cam or the guide to the boat. The cleat can be made to release the line by pulling the line through the cleat.

These and other aspects of the present invention will become apparent in light of the drawings and detailed description provided below.

BRIEF DESCRIPTION OF THE DRAWINGS

The above and other aspects, features and advantages of certain embodiments of the present invention will be more apparent from the following detailed description taken in conjunction with the accompanying drawings, in which.

Figure 1:
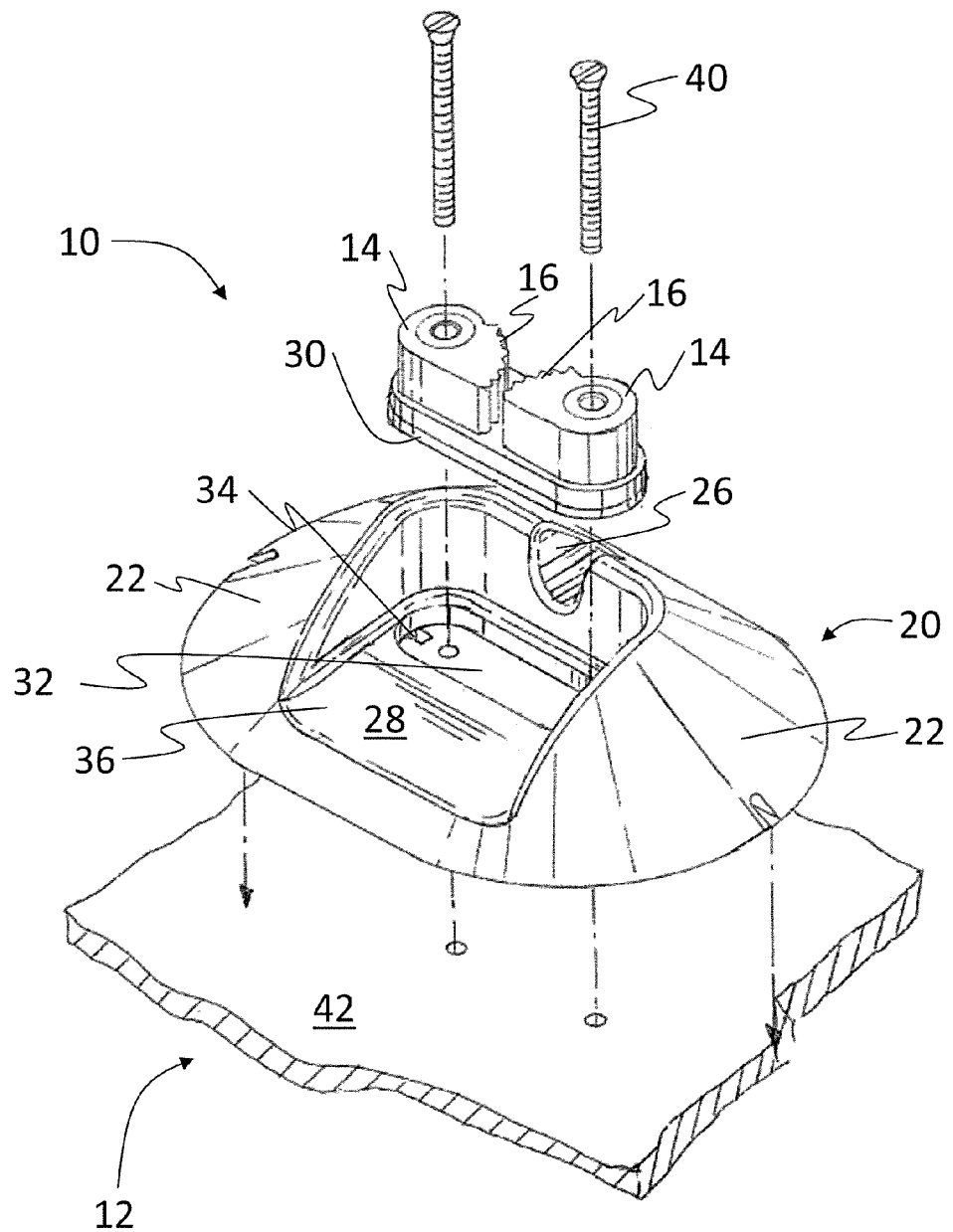
FIG. 1 is an exploded view of the cleat.

While the invention is described with reference to the above drawings, the drawings are intended to be illustrative, and the invention contemplates other embodiments within the spirit of the invention.

DETAILED DESCRIPTION

Referring to FIGS. 1-10, the present disclosure describes a cleat 10 for a boat 12. The cleat includes a cam 14 mounted to the boat 12, where the cam 14 has a rotatable toothed surface 16 for pressing against a line 18. The cleat 10 also includes a guide 20 mounted to the boat 12 adjacent the cam 14, where the guide 20 has a guide surface 22 for directing the line 18 above a top of the cam 24. In addition, the cleat 10 has a slot 26 formed in the guide surface 22, which permits the line 18 to be moved into opposition with the rotatable toothed surface of the cam 16.

Referring to FIG. 1, the cleat 10 is shown including a cam 14 with a rotatable toothed surface 16. The cam 14 is mounted on a cam base 30, and a fastener 40 is inserted through a hole in the center of the cam 14, in order to attach the cam 14 and the guide 20 to the boat surface 42 of the boat 12. The guide 20 has a guide surface 22. Formed into the guide surface 22 is a slot 26, which is U-shaped. The guide 20 also has a base 28 which has a top surface of the base 36. The base 28 has a recess 32, into which the cam base 30 can be inserted to form an interference fit. The walls of the recess are sloped slightly inward from top to bottom, which allows the cam base 30 to be inserted into the recess 32 more easily, and also allows the guide 20 to be readily removed from a mold during manufacturing. The base 28 has a drainage channel 34 to allow water to drain off of the top surface of the base 36.

Figure 2:
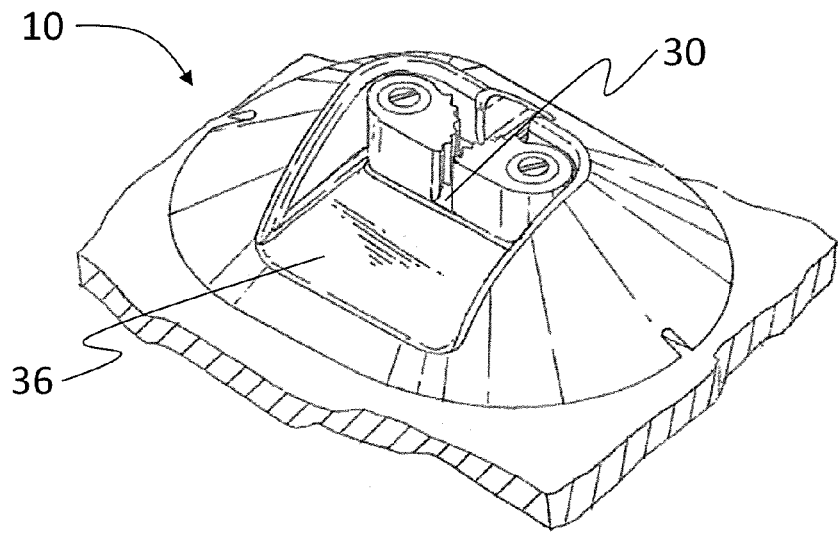
FIG. 2 is an isometric view of the cleat of FIG. 1.

Referring to FIG. 2, the cleat 10 is shown as it would appear fully assembled. The cam base 30 is flush with the top surface of the base 36, such that the top surface of the base 36 would not interfere with a line 18 being inserted into the cleat 10, and also to facilitate water draining off the top surface of the base 36.

Figure 3:
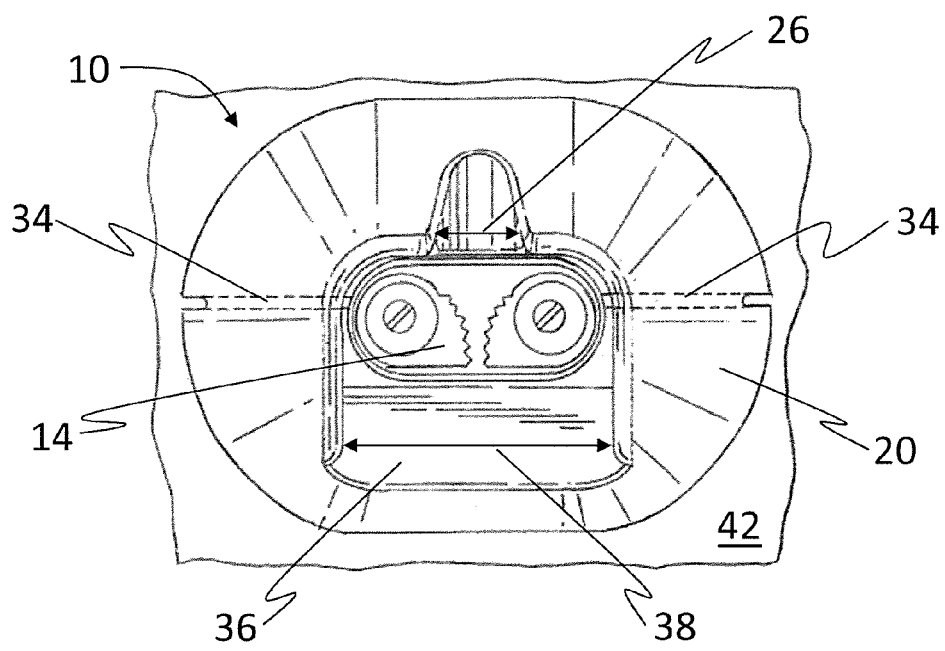
FIG. 3 is a top plan view of the cleat of FIG. 1.

Referring to FIG. 3, the cleat 10 is shown with a slot 26 and an opening 38 on opposite sides of the cam 14. The drainage channels 34 are shown in dotted lines, where the drainage channels 34 allow water to flow from the top surface of the base 36, out of the outlets formed in the sides of the guide 20, and onto the boat surface 42. In other embodiments, the cleat 10 has multiple drainage channels 34, formed in different areas of the base 28, including inlets within the recess 32, and inlets closer to the opening 38. In yet other embodiments, the cam base 30 has its own drainage channels to allow water to drain through the cam 14. In this case, the drainage channels 34 are aligned with the drainage channels in the cam base 30, so that the guide 20 does not interfere with the drainage of water from the cam 14. The drainage channels 34 allow water to drain away out of the cam 14 so that the cam 14 can dry relatively easier and faster. This prevents ball bearings (not shown) inside of the cam 14 from corroding.

Figure 4:
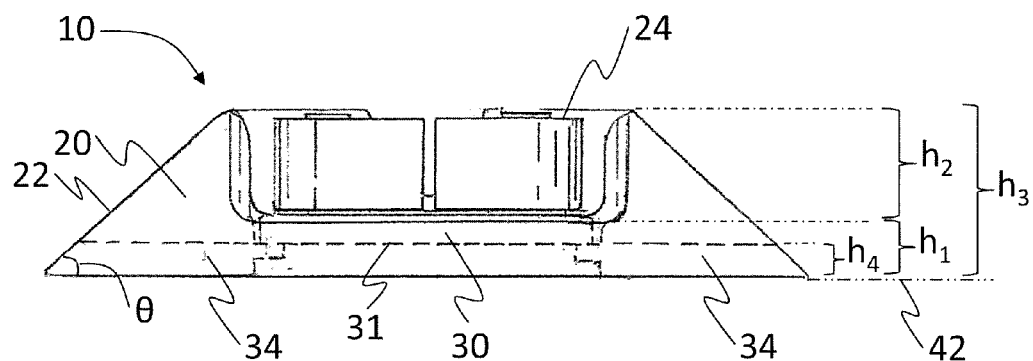
FIG. 4 is a front elevation view of the cleat of FIG. 1.

Referring to FIG. 4, the cleat 10 is shown with the distance from the boat surface 42 to the top surface of the base 36 marked as $h_1$, the distance from the top surface of the base 36 to the top of the cam 24 marked as $h_2$, and the distance from the boat surface 42 to the top of the cam 24 marked $h_3$, where $h_3$ is substantially equal to the sum of $h_1$ and $h_2$. The cam base 30 is shown having a bottom surface of the cam base 31, and a distance from the boat surface 42 to the bottom surface of the cam base 31 is marked as $h_4$. In the illustrated embodiment, $h_4$ is less than $h_1$ because cam base 30 is in a recess 32 formed in the base 28. In other embodiments, such as that shown in FIG. 9, $h_4$ has a zero value since the cam base 30 is mounted directly on the boat 12, and thus the cam base 30 is in direct contact with the boat surface 42. In other embodiments, such as that shown in FIG. 10, $h_4$ would be equal to $h_1$ since the base 28 has no recess 32, and the cam base 30 is mounted directly on the base 28. The drainage channel 34 is shown on both sides of the cleat 10, and the shape of the channel is shown with dotted lines. An angle θ is formed by the guide surface 22. The angle θ impacts how easily a line 18 can slide along the guide surface 22, with smaller angles allowing the line 18 to slide more easily. However, the value of the angle θ also impacts the size of the guide 20, so these factors must be balanced. In an ideal embodiment, θ has a value of 45°. In other embodiments, θ has a value within a particular range, the range being 0°-10°, 10°-30°, 30°-50°, 40°-50°, 43°-47°, 44°-46°, or greater than 50°.

Figure 5:
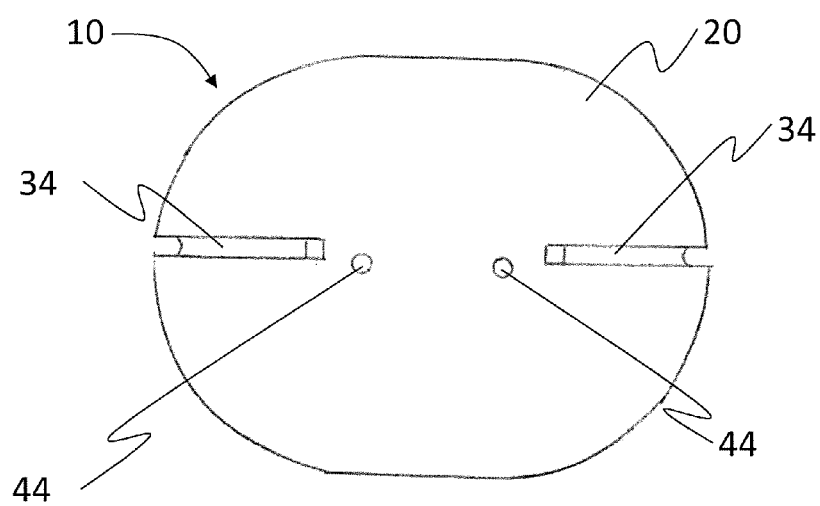
FIG. 5 is a bottom plan view of the cleat of FIG. 1.

Referring to FIG. 5, the cleat 10 is shown with the drainage channels 34 and fastener holes 44 opening into the bottom of the guide 20.

Figure 6:
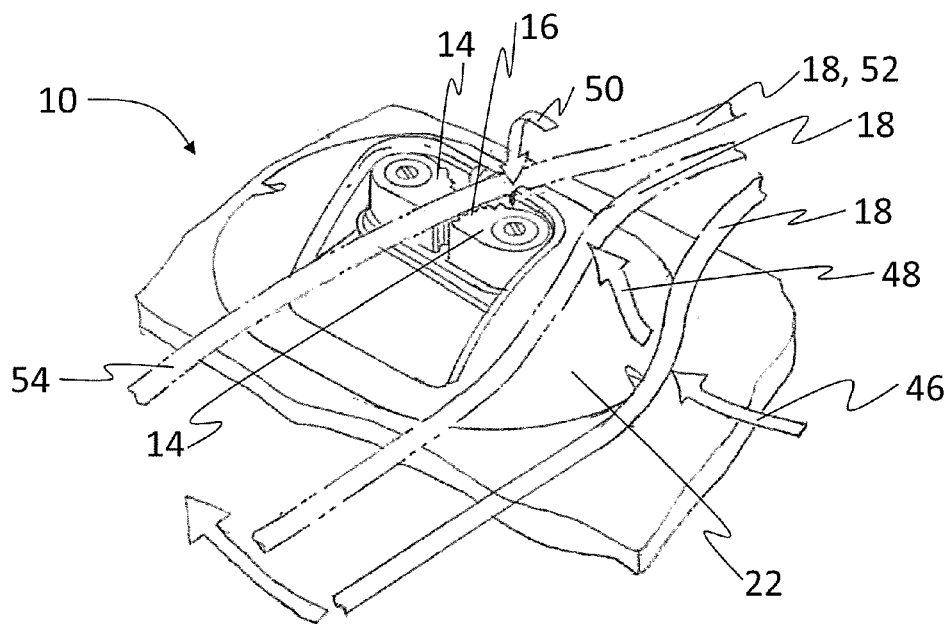
FIG. 6 is an isometric view of the cleat of FIG. 1 showing one possible use of the cleat.

Referring to FIG. 6, during use of the cleat 10, a line 18 slides along a boat surface as indicated by directional arrow 46. The line 18 then slides up the guide surface 22, i.e. the guide surface 22 raises the line 18, as indicated by directional arrow 48. The line 18 then slides into slot 26 (not labeled for the sake of clarity), and between the cams 14, as indicated by directional arrow 50. The rotatable toothed surface 16 on both cams 14 press against the line 18 due to an internal spring in the cam 14 (not shown) which biases the cams 14 closed, so that the line is secured between the cams 14. Once secured, the line 18 is prevented from sliding toward the tension side 52 of the line 18, and can be released from the cleat 10 by pulling on the slack side 54 of the line 18. The guide surface 22, the slot 26, and the opening 38 are smooth and rounded in order to minimize friction with the line 18. This further the design goals for the cleat 10, including: 1) allowing a person, e.g. a sailor, to cleat the line 18 from a relatively greater distance away from the cleat 10 by sliding the line into position as explained above, 2) allowing the line 18 to feed into the slot 10 at a relatively greater angle to the centerline of the cleat 10, since the line 18 can slide along the smooth curved edge of the slot, 3) allowing the line 18 to be pulled through the opening 38 at a relatively greater angle to the centerline of the cleat 10, since the line 18 can slide along the smooth curved edge of the opening, 4) decreasing the rate at which the line deteriorates or frays from being cleated, since the line won't fray or snag on the smooth rounded edges.

Figure 7:
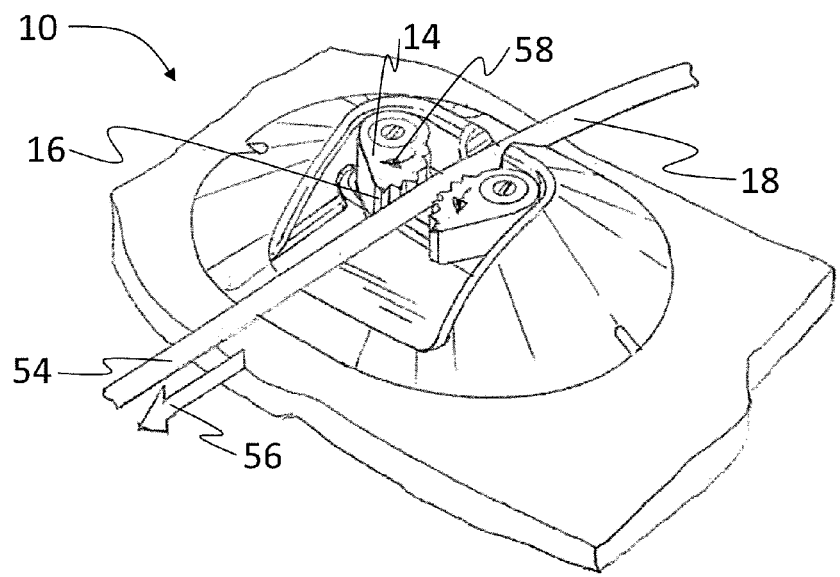
FIG. 7 is an isometric view of the cleat of FIG. 1 showing another possible use of the cleat.

Referring to FIG. 7, during use of the cleat 10, a line 18 is pulled on the slack side 54 moving the line 18 as indicated by directional arrow 56. This causes the cam 14 to rotate as indicated by directional arrow 58, thus causing the rotatable toothed surface 16 to no longer be in contact with the line 18, thereby releasing the line 18 from the cleat 10.

Figure 8:
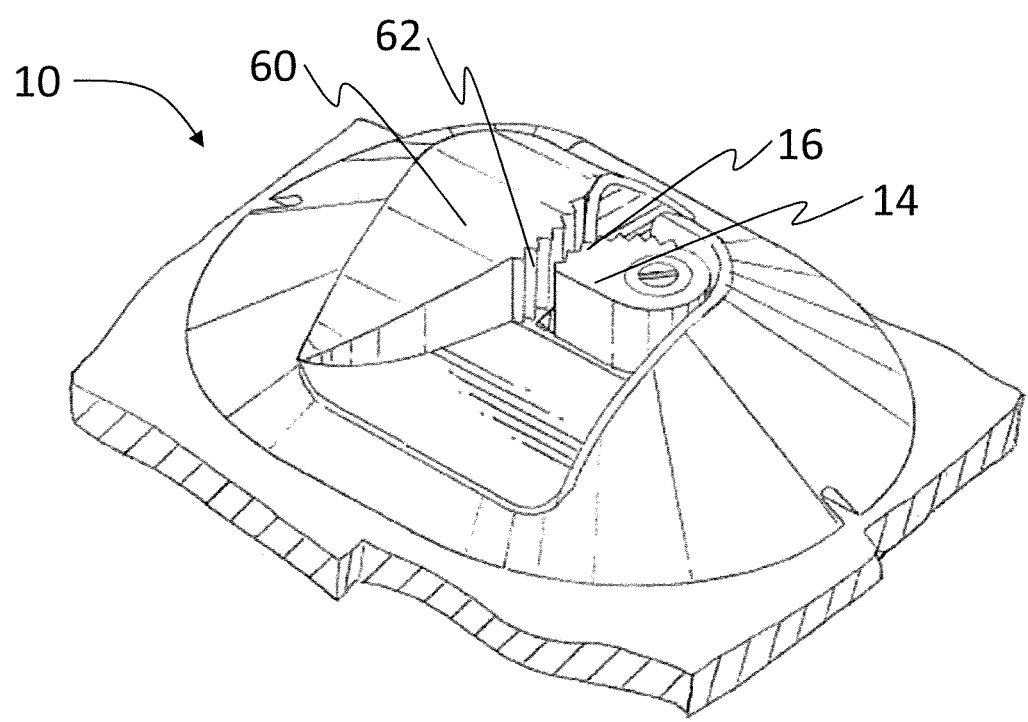
FIG. 8 is an isometric view of the cleat having only one cam and a static side.

Referring to FIG. 8, the cleat 10 is shown having a static side 60 with a toothed surface 62. The cam 14 is adjacent the static side 60, such that the rotatable toothed surface 16 is opposing the toothed surface 62. The static side 60 may be formed as an integral part of the guide 20 or as a separate component. If formed as a separate component, the static side 60 can be placed on top of one of the cams 14 as a quickly implemented temporary fix in the event that the cam 14 stops functioning or breaks off.

Figure 9:
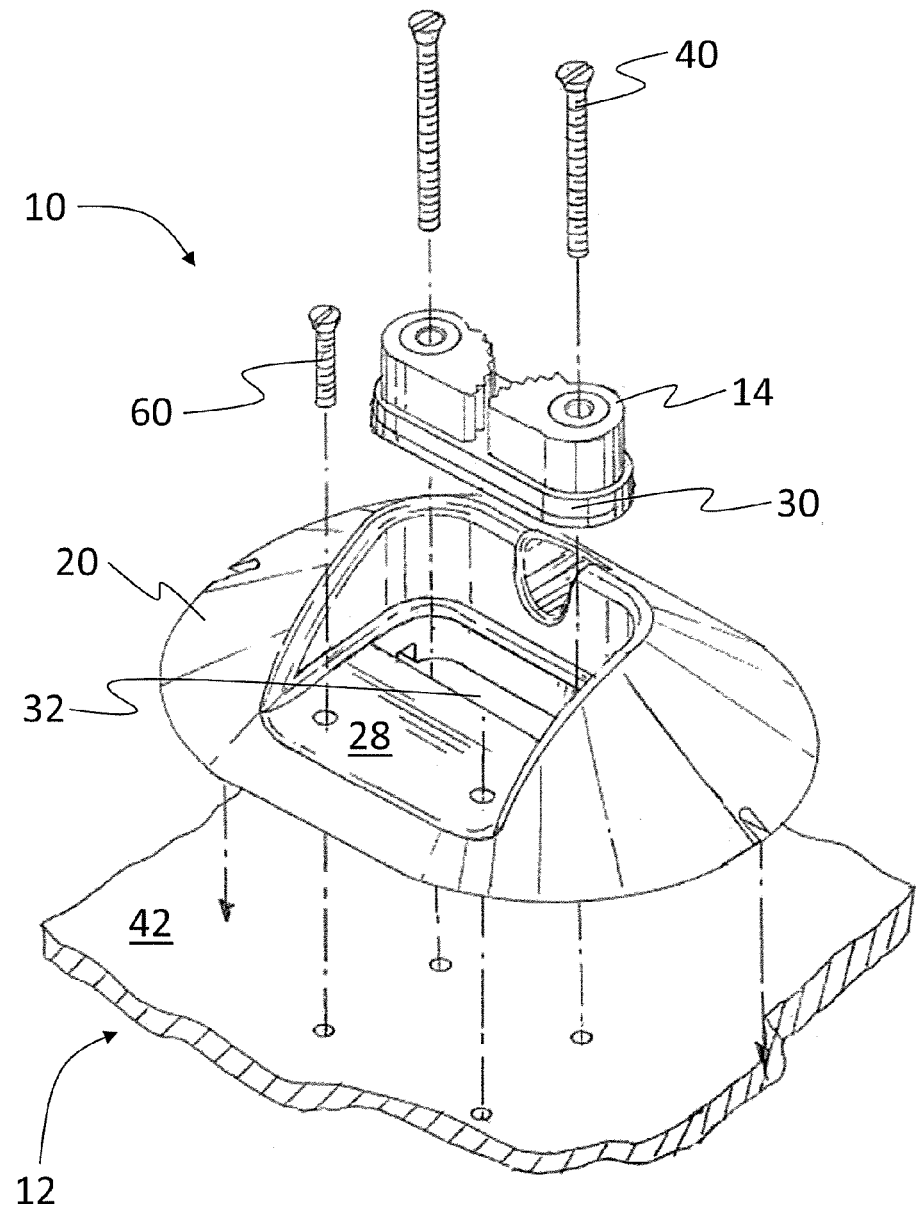
FIG. 9 is an isometric view of the cleat having a recess in the base that extends all the way through the guide.

Referring to FIG. 9, the cleat 10 is shown having a recess 32 in the base 28 that extends all the way through the guide 20. The cam 14 is mounted on a cam base 30, and a fastener 40 is inserted through a hole in the center of the cam 14, in order to attach the cam 14 to the boat 12 such that the cam base 30 is in direct contact with the boat surface 42. The guide 20 is attached to the boat surface 42 by fastener 60.

Figure 10:
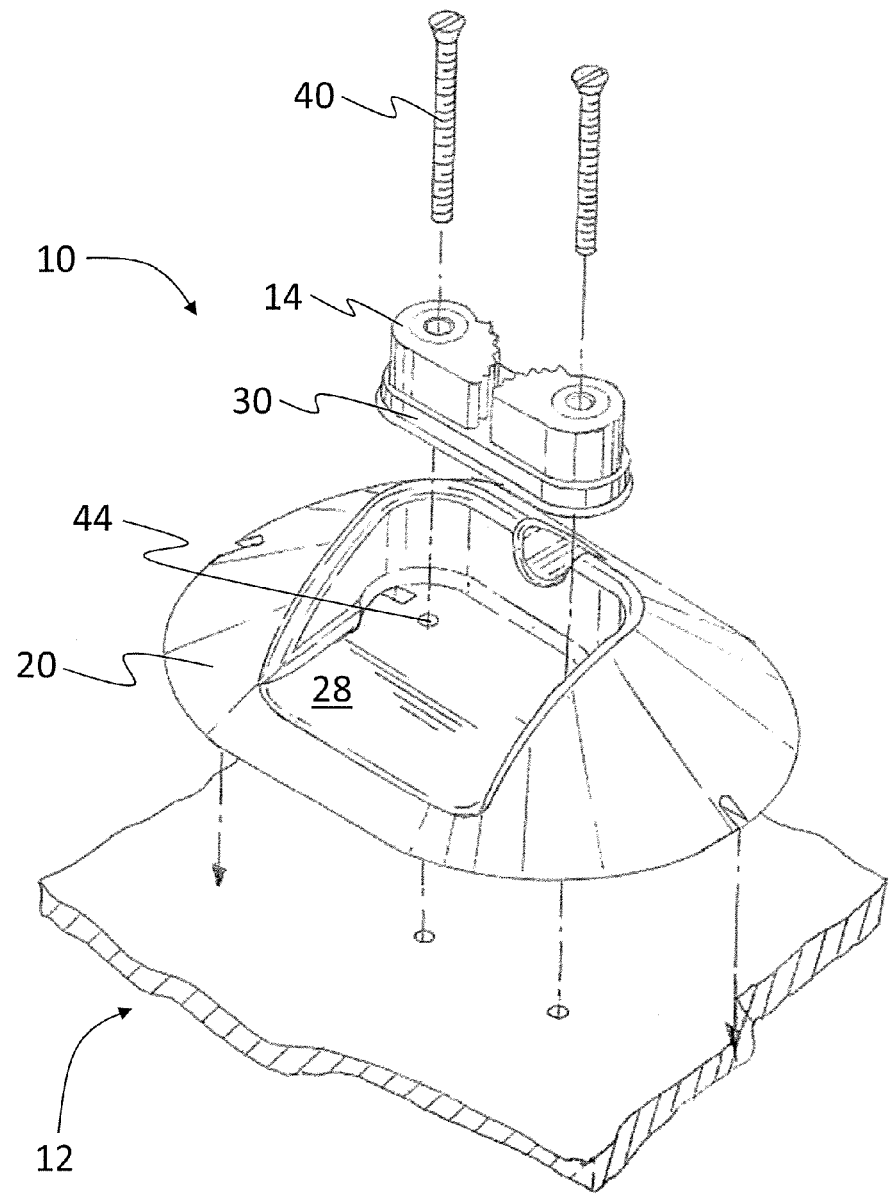
FIG. 10 is an isometric view of the cleat having no recess in the base.

Referring to FIG. 10, the cleat 10 is shown with a base 28 that does not have a recess. The cam 14 is mounted on a cam base 30, and a fastener 40 is inserted through a hole in the center of the cam 14, and through fastener hole 44, in order to attach the cam 14 and the guide 20 to the boat 12. Here, the cam base 30 is in direct contact with the base 28. It will be appreciated by those of skill in the art that there are a number of methods for attaching the cam 14 to the boat surface 42, the cam 14 to the guide 20, the guide 20 to the boat surface 42, or both the cam 14 and the guide 20 to the boat surface 42. These methods include the use of fasteners 40, 60, or through devices and methods such as screws, nails, bolts, suction cups, adhesive, hook and loop fasteners, an interference fit between parts, or by any other means known by those skilled in the art, or any combinations thereof.

In the illustrated embodiment, the cleat 10 is formed from a polymer such as carbon fiber, and the cams 14 are aluminum. In other embodiments, the cleat 10 and/or the cams 14 may be manufactured from materials such as rubber, wood, clay, cement, concrete, glass, organic materials, stainless steel, aluminum, brass, various types of metal, or any other materials known by those skilled in the art, and including combinations thereof.

The cleat 10 offers several advantages over known cleat devices. Among other things, a line 18 can be moved into and out of the cleat 10 without having to feed the end of the line 18 through the cleat 10 as would be necessary with a prior art device such as an eye strap, since the eye strap is not open on top. In addition, a line 18 can be cleated at a distance and more easily cleated, due to the sloped guide surface 22 and smooth rounded edges of the guide 20, slot 26, and opening 38, which allow the line 18 to easily slide from the boat surface 42 over the top of the cam 24 and into the slot 26. This design also protects individuals that slide into the cleat 10 from bruising or cutting themselves on the cleat 10, which is an important feature in situations like sailing where the boat is generally unstable and people are often sitting on or leaning against the boat surface 42, which has multiple cleats attached to it. The cleat 10 may also be useful to hide or seal holes in the boat surface 42, such as might occur when replacing a larger cleat with a smaller one. Other embodiments of the cleat 10 may include common objects on a boat surface 42, such as a block, being protected by the guide 20, since sailors often slide into other such objects.

While several embodiments have been disclosed, it will be apparent to those of ordinary skill in the art that aspects of the present invention include many more embodiments and implementations. Accordingly, aspects of the present invention are not to be restricted except in light of the attached claims and their equivalents. It will also be apparent to those of ordinary skill in the art that variations and modifications can be made without departing from the true scope of the present disclosure. For example, in some instances, one or more features disclosed in connection with one embodiment can be used alone or in combination with one or more features of one or more other embodiments.

What is claimed is:

1. A cleat for a boat, comprising:
   a cam mounted to a surface of the boat and having a rotatable toothed surface for pressing against a line;
   a guide mounted to the surface of the boat adjacent said cam, said guide having a bottom portion, a top portion, and a slide surface that extends from the bottom portion to the top portion, the slide surface is sloped relative to the bottom portion to direct the line from the surface of the boat to a point above a top of said cam; and
   a slot formed in the slide surface of said guide, wherein said slot is configured to permit the line to be moved into opposition with the rotatable toothed surface of said cam.

2. The cleat of claim 1, wherein said guide surrounds said cam on at least two sides.

3. The cleat of claim 1, wherein said guide surrounds said cam on at least three sides.

4. The cleat of claim 1, wherein said guide substantially surrounds said cam.

5. The cleat of claim 1, wherein said guide has a base.

6. The cleat of claim 5, wherein said cam is mounted on a cam base.

7. The cleat of claim 6, wherein said cam base is mounted on said base, and said guide substantially surrounds said cam.

8. The cleat of claim 6, wherein said base has a recess, and said cam base is mounted in the recess.

9. The cleat of claim 6, wherein a distance from the surface of the boat to a top surface of said base is $h_1$, a distance from the top surface of said base to the top of the cam is $h_2$, a distance from the surface of the boat to the top of the cam is $h_3$, and $h_3$ is substantially equal to a sum of $h_1$ and $h_2$.

10. The cleat of claim 9, wherein a distance from the surface of the boat to a bottom surface of said cam base is $h_4$, and $h_4$ is substantially equal to $h_1$.

11. The cleat of claim 9, wherein said base has a recess, and said cam base is mounted in the recess; and
   a distance from the surface of the boat to a bottom surface of said cam base is $h_4$, and $h_4$ is less than $h_1$.

12. The cleat of claim 5, wherein said base includes at least one drainage channel configured to allow water to drain off a top surface of said base.

13. The cleat of claim 1, wherein said cam is mounted on a cam base, and said cam base is in contact with the surface of the boat.

14. The cleat of claim 1, wherein said cam is a first cam, and said rotatable toothed surface is a first rotatable toothed surface, and the cleat further comprises a second cam having a second rotatable toothed surface; and
   wherein said first cam is adjacent to said second cam such that the first rotatable toothed surface is opposing the second rotatable toothed surface.

15. The cleat of claim 1, further comprising:
   an opening formed in the slide surface of said guide;
   wherein said slot and said opening are on opposite sides of said cam.

16. The cleat of claim 1, wherein said guide raises the line to the top of said cam.

17. The cleat of claim 3, further comprising at least one fastener attaching at least one of said cam or said guide to the boat.

18. A method of using a cleat, comprising the steps of:
   directing a line along a surface of a boat and toward a guide mounted to the surface of the boat adjacent a cam, the guide having a bottom portion, a top portion, and a slide surface that extends from the bottom portion to the top portion, the slide surface is sloped relative to the bottom portion;
   sliding the line along the sloped slide surface of the guide so that the line is directed to a point above a top of the cam;
   directing the line into a slot formed in the slide surface of the guide; and
   snapping the line into the cleat so that the line presses against toothed surface of the cam and is secured.

19. The method of claim 18, further comprising the step of: pulling the line so that the cam releases the line.

20. A cleat for a boat, comprising:
   a cam mounted to a surface of the boat and having a rotatable toothed surface for pressing against a line;
   a guide mounted to the surface of the boat adjacent said cam, said guide having a bottom portion, a top portion, and a slide surface that extends from the bottom portion to the top portion, the slide surface is sloped relative to the bottom portion to direct the line from a surface of the boat to a point above a top of said cam;
   a slot formed in the slide surface of said guide, the slot being substantially U-shaped and configured to permit movement of the line into opposition with the rotatable toothed surface of said cam; and
   a fastener extending through a rotational axis of said cam to mount said cam and said guide to the surface of the boat;
   wherein the slide surface of the guide is sloped at an angle between 30° and 50° relative to the bottom portion of the guide.

* * * * *